UNITED STATES PATENT OFFICE.

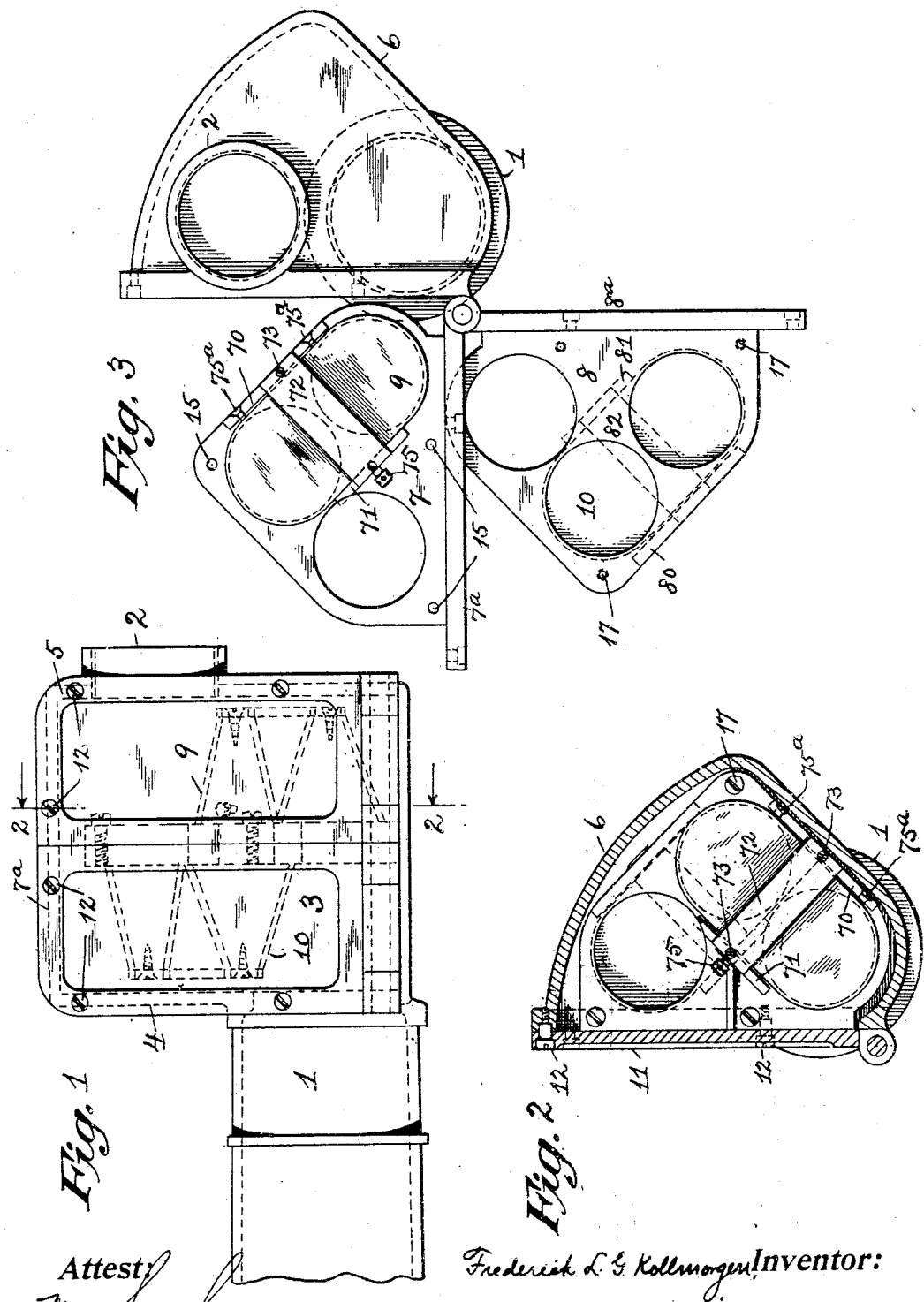

FREDERICK L. G. KOLLMORGEN, OF MONTCLAIR, NEW JERSEY, ASSIGNOR TO KEUFFEL & ESSER COMPANY, OF HOBOKEN, NEW JERSEY, A CORPORATION OF NEW JERSEY.

OPTICAL INSTRUMENT.

941,021.

Specification of Letters Patent.   Patented Nov. 23, 1909.

Application filed June 25, 1908.   Serial No. 440,224.

*To all whom it may concern:*

Be it known that I, FREDERICK L. G. KOLLMORGEN, a citizen of the German Empire, and resident of Montclair, Essex county, New Jersey, have invented certain new and useful Improvements in Optical Instruments, of which the following is a specification.

My invention relates to telescopes and particularly to that class of instruments in which Porro prisms are used to shorten the distance between the eye piece and the objective.

In the drawings, Figure 1 is a top plan view of a portion of a telescope embodying my invention, the concealed parts being shown in dotted outline; Fig. 2 is a transverse section on the plane of the line 2—2 in Fig. 1 and Fig. 3 is a side elevation of the parts looking from the right toward the left in Fig. 1 and showing the prisms out of the telescope and in a position to be cleaned, adjusted or otherwise manipulated.

It is eminently desirable that in an instrument of this character all of the parts should be accessible in order that they may readily be cleaned and adjusted. It is also desirable that if they are removed from their position in the telescope they should be restored exactly in their former position with respect to the other parts of the instrument, and it is also desirable that access should be afforded to the surfaces opposite the space between the prisms as well as to their other surfaces. So far as known to me the art does not disclose an instrument possessing all of these advantages and it is my purpose to supply such an expressed need.

In the drawings, 1 represents one portion of a telescope; 2 is a second portion and 3 is the prism container between them. The telescope, it will be assumed, is supplied with the usual optical elements, offset in the usual manner through which the rays of light pass and the prisms are arranged in the usual manner, so as to achieve the erection of the image.

The container 3 has two end walls, one 4 to receive the tube 1 and the other 5 to receive the tube 2, these walls are roughly triangular in shape and they are connected by a continuous bottom wall 6.

Two frames or brackets 7 and 8 are secured to wings or supports 7ª, 8ª which are hinged to the upper edge of the bottom wall 6, on one of these adjacent to the tube 2 is mounted the prism member 9 and on the other adjacent to the tube 1 is mounted the prism member 10. These prism members are each firmly secured in place in the usual manner. Each support 7ª, 8ª serves to close a container and it is held in position by screws 12, so as securely to close it against dust. The brackets 7 and 8 are held together by any suitable means, as screws 17 and screw holes 15.

When it is desired to use the device, the lid is unfastened and both of the frames 7 and 8 are swung on their hinges to bring them together out of the container but without detaching them from it. The parts are then readily accessible including the two opposed surfaces of the prisms, when the frames are separated from each other. They may be adjusted or cleaned, but if the adjustment is not touched it is obvious that when returned within the container the parts will register with their proper coöperating parts as before.

Secured to or made integral with the bracket 7 are two externally projecting plates 70 and 71 between which is secured the prism 9 by means of an intermediate transverse plate 72 secured to the plates 70 and 71 by means of screws 73, or in any other suitable manner. Adjusting screws 75 75ª are adapted to be passed through the plates 70 and 71 and impinge against the sides of the prism to secure its proper adjustment. In a similar manner two plates 80 and 81 with an intermediate plate 82 are secured to the bracket 8 and serve to hold the prism 10, and adjusting screws precisely similar to the screws 75 and 75ª serve to effect the adjustment of that prism.

This construction makes it possible to mount the prisms close to each other and yet to have their opposed surfaces quite accessible. In all other forms of such instruments known to me accessibility is only secured by leaving a relatively great distance between the prisms and this necessitates the use of an unnecessarily large prism which I avoid. In my device both prisms may be small and of equal size. Not only are the prisms accessible but by coupling the brackets together I secure greater strength while they are being moved and yet can separate them after they are moved. The method of securing the prisms also permits of complete accessibility of the adjusting means.

What I claim as new is:—

1. An optical instrument comprising a tubular body, an offset prism container open on one side and two hinged supports each adapted to carry prism elements.

2. An optical instrument comprising a tubular body, an offset prism container open on one side and provided with a plurality of separately hinged supports forming inclosures each adapted to carry prism elements, whereby each of such prism elements may be swung out from and returned to the instrument without disturbing their relative position with respect to the other parts of the device.

3. An optical instrument comprising a tubular body, an offset prism container open on one side and two hinged supports each adapted to carry prism elements in combination with means whereby the supports may be detachably secured to the container.

4. An optical instrument comprising a tubular body, an offset prism container open on one side and two hinged supports secured thereto, each adapted to carry prism elements, and each movable on their hinges relatively to each other to afford access to the opposed surfaces of the prisms.

5. An optical instrument comprising a tubular body, an offset prism container open on one side and two hinged supports secured thereto, each adapted to carry prism elements of identical size and each movable on their hinges relatively to each other to afford access to the opposed surfaces of the prisms.

6. An optical instrument comprising a tubular body, an offset prism container open on one side and two hinged supports each adapted to carry prism elements and arranged to be swung separately or together.

7. A prism bracket comprising two externally projecting plates adapted to engage the prism, an intermediate plate secured to both projecting plates and adjusting screws passing through the projecting plates to contact with the prism so that it may be adjusted relative to the plates.

Witness my hand this 20th day of June 1908, at New York, N. Y.

FREDERICK L. G. KOLLMORGEN.

Witnesses:
HERMAN MEYER,
ALAN C. McDONNELL.